(12) United States Patent
Gegner

(10) Patent No.: US 7,163,650 B2
(45) Date of Patent: *Jan. 16, 2007

(54) PROCESS FOR PRODUCING CERAMIC BEARING COMPONENTS

(75) Inventor: Jürgen Gegner, Fürth (DE)

(73) Assignee: AB SKF, Gothenburg (SE)

( * ) Notice: Subject to any disclaimer, the term of this patent is extended or adjusted under 35 U.S.C. 154(b) by 300 days.

This patent is subject to a terminal disclaimer.

(21) Appl. No.: 10/351,526

(22) Filed: Jan. 27, 2003

(65) Prior Publication Data

US 2003/0176270 A1   Sep. 18, 2003

(30) Foreign Application Priority Data

Jan. 25, 2002   (DE) .................................. 102 03 473

(51) Int. Cl.
*B28B 1/00*   (2006.01)
*C04B 35/589*   (2006.01)

(52) U.S. Cl. ....................... 264/29.6; 264/624

(58) Field of Classification Search ............... 264/624, 264/625, 626, 29.1, 29.6, 29.7, 678
See application file for complete search history.

(56) References Cited

U.S. PATENT DOCUMENTS

| | | | |
|---|---|---|---|
| 3,853,567 A * | 12/1974 | Verbeek ..................... | 501/90 |
| 4,097,294 A | 6/1978 | Rice et al. | |
| 4,374,793 A | 2/1983 | Koga et al. | |
| 5,272,239 A * | 12/1993 | Jensen ......................... | 528/9 |
| 5,599,109 A * | 2/1997 | Negwer ....................... | 384/308 |
| 6,171,179 B1 * | 1/2001 | Chiou et al. ................. | 451/262 |
| 6,709,999 B1 | 3/2004 | Greil et al. | |
| 6,743,393 B1 * | 6/2004 | Petrak ......................... | 264/625 |
| 6,783,866 B1 * | 8/2004 | Greil et al. ................. | 428/626 |
| 2003/0114294 A1 | 6/2003 | Gegner | |

FOREIGN PATENT DOCUMENTS

| | | |
|---|---|---|
| DE | 28 03 658 A1 | 8/1978 |
| DE | 43 18 974 A1 | 12/1994 |
| DE | 198 55 811 A1 | 6/2000 |
| DE | 100 30 011 A1 | 1/2002 |
| EP | 0 412 428 B1 | 2/1991 |
| EP | 0 366 443 B1 | 9/1993 |
| EP | 1 310 469 A2 | 5/2003 |
| WO | 00/32537 A2 | 6/2000 |
| WO | 01/10791 A1 * | 2/2001 |

OTHER PUBLICATIONS

Lee, Burtrand I. and Pope, Edward J. A., "Chemical Processing of Ceramics", Copyright 1994, pp. 382 and 391.*
Richerson, David W., "Modern Ceramic Engineering—2nd Edition", Copyright 1992, pp. 551-552.*

* cited by examiner

Primary Examiner—Steven P. Griffin
Assistant Examiner—Carlos Lopez
(74) Attorney, Agent, or Firm—Buchanan Ingersoll & Rooney PC

(57) ABSTRACT

A process for producing ceramic bearing components in which a material mixture is produced from an organometallic compound as a preceramic precursor and from silicon in element form or in the form of an alloy as a chemically reactive filler. The material mixture is subjected to reaction pyrolysis for conversion into a ceramic material.

54 Claims, 1 Drawing Sheet

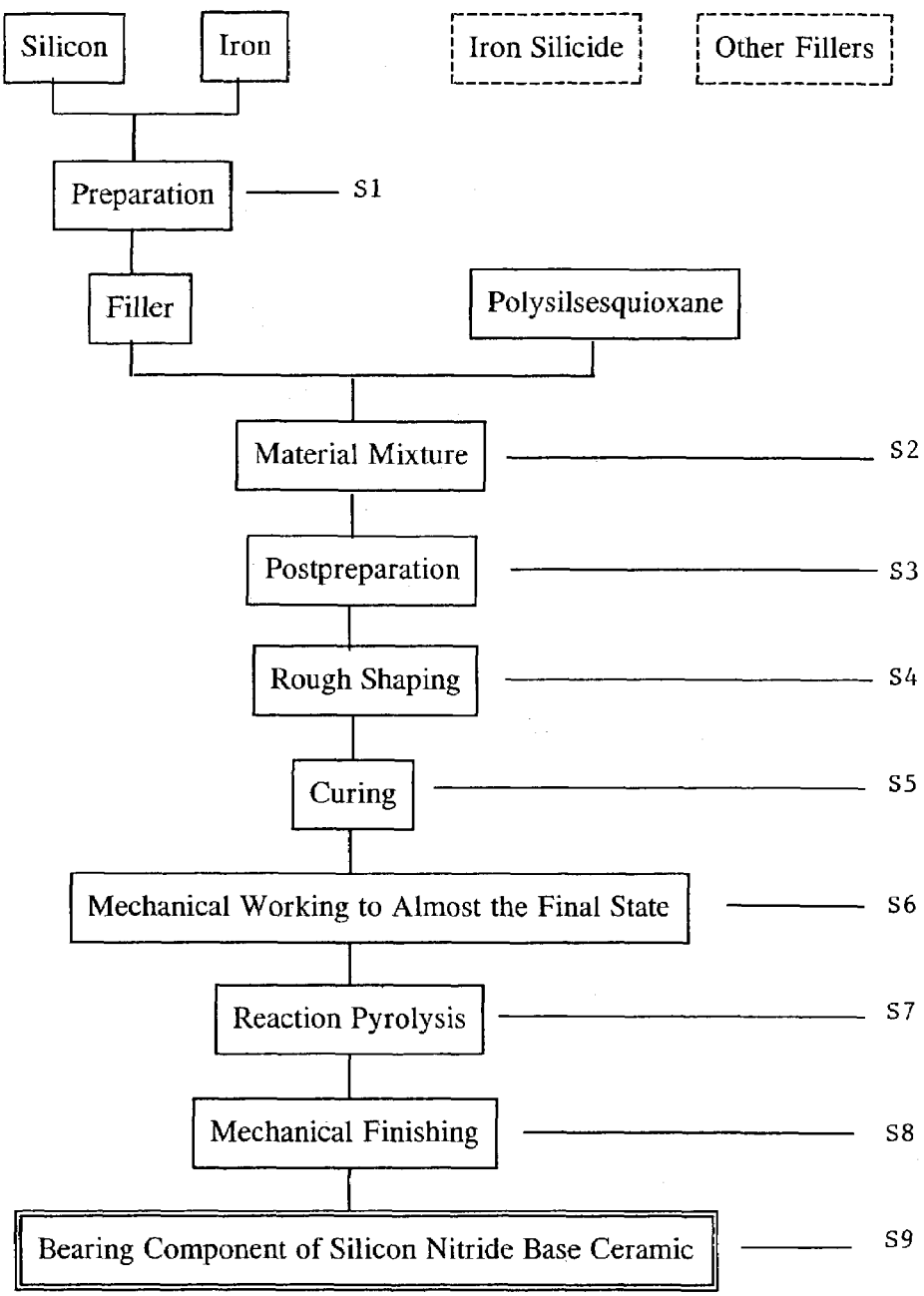

PROCESS FOR PRODUCING CERAMIC BEARING COMPONENTS

This application is based on and claims priority under 35 U.S.C. § 119 with respect to German Application No. 102 03 473.7 filed on Jan. 28, 2002, the entire content of which is incorporated herein by reference.

FIELD OF THE INVENTION

The invention generally relates to bearings. More particularly, the present invention pertains to ceramic bearing components and a process for producing ceramic bearing components.

BACKGROUND OF THE INVENTION

It is known in the industry to use ceramic bearing components in both slide bearing applications and roller bearing applications. The bearing components can be, for example, roll bodies or bearing rings of a ceramic roller bearing of a hybrid roller bearing (rings of roller bearing steel) or of a slide bearing. These bearing components can be made of sintered and hot-pressed ceramic, among others, to produce components having good fatigue and abrasion resistance (high wear resistance, low wear rate). Silicon nitride is one such type of material. Hot-pressed (HPSN), hot-isostatically pressed (HIPSN) and directly sintered silicon nitride (SSN) are commonly used. In addition, ceramic bearing components can also be made, for example, from zirconium oxide, aluminum dioxide and silicon carbide.

Published European Application No. 0 366 443 discloses ceramic bearing elements and a process for producing such bearing elements. The bearing elements are formed from a ceramic material which has a content of metallic components in an amount of 3500 ppm or less and which contains several of the elements iron, nickel, chromium and tungsten. In the disclosed process for producing a ceramic roller bearing element, raw ceramic material powder is converted into a slurry form. The slurry is granulated, shaped into the desired form, and sintered. During the process, metallic components are reduced to a residual value of 3500 ppm or less.

Although ceramic bearing components have repeatedly proven themselves because they have a comparatively long service life even under extreme conditions, for example high temperatures or lubricant loss, the use of ceramic bearing components has long been limited mainly to the area of special applications. This is due at least in part to the fact that the production costs of bearing components when using known production processes are distinctly higher than the production costs for comparable bearing components of steel.

It would thus be desirable to develop a process for producing ceramic bearing components which is cost favorable while still capable of meeting the high quality demands which prevail in the domain of bearing engineering.

SUMMARY OF THE INVENTION

One aspect of the invention involves a process for producing ceramic bearing components which includes producing a material mixture from an organometallic compound as a preceramic precursor and from silicon in element form or in the form of an alloy as a chemically reactive filler. The material mixture is then subjected to reaction pyrolysis. The bearing components can be produced especially based on silicon nitride and silicon carbide.

Preferably silicon nitride base ceramics are produced. The volumetric ratio of the organometallic compound to the filler is typically in the range around 50%, shifted in favor of the organic precursor. In the reaction pyrolysis, thermal conversion (thermolysis) of the polymer into a ceramic material takes place.

Compared to the previously used sintering and hot pressing processes for producing ceramic bearing components, this process proceeds more rapidly. In addition, due to significantly lower temperatures compared to the typical sintering temperatures for silicon nitride from 1700° C. to 2000° C., this process requires lower energy usage and much less sensitivity, and therefore decidedly less complex process control. Moreover the raw materials used are comparatively economical. Also, under suitable process conditions during pyrolytic ceramicization, hardly any shrinkage occurs, especially for simple shaped bodies, such as for example rolls or balls produced from bars or rods for roller bearings, and larger volumetric changes can also be allowed on a controlled basis.

The material mixture can contain a cross-linking, organometallic, especially organosilicon compound, such as for example a silicone or polysiloxane as the preceramic precursor. Silicone resins or polysilsesquioxanes and others are especially well suited due to the preprocessing which can be carried out in air (relative invulnerability to moisture, hydrolysis stability) and also due to their corresponding availability which makes them comparatively economical. They are available in solid and liquid form with a varied viscosity, and over their wide range of compositions, in addition to the silicon content, allow especially the selection of various carbon and oxygen proportions.

The material mixture can contain a metal in element form, in the form of an alloy, in the form of an intermetallic phase or in the form of any chemical composition as the chemically reactive filler. The metallic component is added during reaction pyrolysis especially to form, for example, carbides, nitrides, or oxides. In particular, the material mixture can contain a metal silicide as the chemically reactive filler. The atomic ratio of metal to silicon is roughly 1:2 or lower. That is, there is approximately two times as much as, or even more, silicon in the mixture compared to the metal content. The metals are generally transition metals (for example, chromium, iron, molybdenum, etc.) since as added elements they catalyze nitriding (nitrogen atmosphere) of the silicon within the framework of reaction pyrolysis. In particular, iron is well suited, i.e., preferably a silicon/iron or silicon/iron/iron silicide mixture is used, and the silicon/iron component can consist of elements or an alloy. Technically speaking, the name ferrosilicon (FeSi: among others used as a soldering aid and economically available) is conventional for this. In each case, the mixing ratio, optionally also depending on the average chemical composition of the iron silicide material, is typically chosen according to an atomic ratio between silicon and iron of roughly 2:1 (corresponds roughly to FeSi50; the silicon portion as is technically conventional is labeled in % by weight) or more (i.e. more silicon, for example FeSi75). Especially for a silicon/iron mixture, it is important for the nitrogen (reactive gas atmosphere) to be activated by iron for the filler reaction, and a certain iron residue can remain in the ceramic pyrolyzate. The use of a silicon/iron or silicon/iron/iron silicide mixture in turn has the advantage that these materials are available very economically. Here for example the use of suitable industrial residues from, including among others, the steel industry (producing and processing), the silicon, wafer and semiconductor industry should be considered, if necessary after the corresponding treatment. Here it should be noted that the alloying elements and accompanying elements of the steel, such as for example chromium, molybdenum, aluminum, silicon and also carbon, as well as possibly added abrasive residues, especially silicon carbide, for further use within the framework of the process of the present invention exhibit favorable filler action (chemically reactive or inert) and residual organic components are thermally reacted at the same time. The chemically reactive filler can be processed in powder form with a grain size in the range around 1 micron to several dozen microns.

Moreover, the material mixture can contain other chemically reactive fillers, for example aluminum (which is economical for forming aluminum oxide with the oxygen contained in the silicone resin). Likewise the material mixture can contain at least one inert filler which can be processed in powder form or also as fibers, especially as short fibers. This can help improve the material fatigue and wear resistance. In particular, zirconium oxide and/or aluminum oxide and/or silicon carbide and/or silicon nitride, with the latter also promoting nucleation of silicon nitride within the framework of reaction pyrolysis in the nitrogen atmosphere, can be added in a finely distributed manner to improve the mechanical properties and/or the reaction kinetics. By suitable selection of, for example, the filler combination and pyrolysis conditions (temperature control and pressure control, for example in a nitrogen atmosphere), the shrinkage behavior, the mechanical and electrical properties (especially with an objective of the conductivity of the resulting bearing components being as relatively low as possible) of the polymer-derived ceramic can be further optimized quite efficiently. This applies likewise to other material characteristics of the final product, such as the coefficient of thermal expansion or thermal conductivity and to magnetic properties. The chemical composition of the organometallic compound used can also be incorporated into this material optimization.

The addition of the material mixture, depending on the form of the polysilsesquioxane (e.g., liquid with varied viscosity, solid resin) and the volumetric proportion of the filler (typically in the range around 30% to 50%), for example to a suspension, solvent dispersal, hot liquid or dry mixing, can take place by kneading, stirring, intensive mixing and the like. Here special attention should be paid to the homogeneity of the mixture. Depending on the material mixture, degassing, drying or extrusion and granulation can follow as posttreatment.

The reaction pyrolysis can be carried out at least partially in a chemically reactive gas atmosphere, with a nitrogen atmosphere being especially suitable. The gas atmosphere makes available other reaction partners, especially with the objective of producing ceramic nitride-based, preferably silicon nitride, ceramic material. In the sense of a reaction which proceeds as efficiently as possible, it is advantageous if the reaction pyrolysis is carried out under an overpressure of typically a few bars to roughly 50 bar (atmospheric pressures of a few 100 bar are possible here). In particular the process, for example oriented to optimum nitriding conditions and the use of the respective porosity state, can be carried out with a variation of the pressure in the indicated overpressure range. In the interests of an economical process which is less complex in terms of (safety) engineering, preferably a pressure of roughly 50 bar is not exceeded to the extent possible. Alternatively or additionally, the reaction pyrolysis can also be carried out at least partially in a chemically inert gas atmosphere or in a vacuum.

The final temperature of pyrolysis which is typically maintained over a few hours is between 1000° C. and 1700° C., preferably between 1200° C. and 1500° C. For economic reasons, due to the simpler furnace technology, it is fundamentally preferred that a temperature from 1400° C. to 1500° C. not be exceeded, to the extent possible. Here, too, for example because of regions of temporary open porosity and others, and with the objective of expelling the oxygen as extensively as possible (if so desired, depending on the filler combination used) a temperature-controlled multistage process can be selected. In other words, the temperature can be varied. Heat treatment can be carried out beforehand roughly in the range from 400° C. to 1000° C. with holding times on the order of 1 hour, especially using the temperature windows of open porosity with respect to reactivity with a reactive atmospheric gas (preferably nitrogen). The described procedure has the advantage that an especially high quality ceramic material is produced, essentially free of residual polymer for example. A microscopically structured ceramic material is produced, optionally with a low metallic portion, in the case of using a suitable organosilicon precursor with a silicon/metal or silicon/metal/metal silicide mixture as a chemically reactive filler and nitrogen atmosphere consisting of primarily silicon nitride and carbide. Depending on the choice of the reaction partners and process conditions, oxygen-containing or oxygen-free ceramic material can be produced or a small proportion of residual polymer can be preserved in the composite material. The Reaction pyrolysis can be followed by conventional postsintering.

Before reaction pyrolysis, initial shaping of the material mixture oriented or configured roughly to the orientation or configuration of the bearing component can be carried out, for example by pressing or casting and then hardening the organometallic compound which is contained in the material mixture. This stabilization to a green component as free of pores as possible can take place with or without weight loss and especially under pressure and by adding heat at a temperature of roughly 100° C. to 300° C. Alternatively or in addition, hardening can also be completed by the action of radiation or can be promoted by additives. From the standpoint of hardening, a semifinished product of stable shape can be produced from the material mixture, and from it the bearing components can be produced almost in the final state in their dimensions before carrying out the reaction pyrolysis. This has the advantage that the mechanical working necessary for producing the bearing components takes place for the most part with conventional processes which are customary in the industry, for example by machining with low tool wear on the relatively soft green component and not on the hard, brittle ceramic product. This greatly facilitates working so that efficient and economical production is possible.

The components of the material mixture can be matched to one another such that the bearing components in the course of reaction pyrolysis are not exposed to any noteworthy shrinkage or generally do not experience a controlled, low volume change which is tailored to the final finishing. This has the advantage that the cross-linked green component can be machined almost to its final dimensions. After carrying out the reaction pyrolysis, mechanical finishing (for example, grinding, honing, lapping) of the ceramicized bearing components can be done. But in this case, only a relatively small amount of material removal is necessary. Particularly in the production of shaped bodies, such as for example rolls and balls for ball bearings made from bars or rods, there can be greater shrinkage or even a volumetric expansion to the desired target size in a controlled manner. To improve the mechanical properties, the ceramic product can be shot-peened before or after mechanical finishing, whereby residual compressive stresses which inhibit cracks are introduced in the edge area.

To produce bearing components based on silicon nitride, polysilazanes are fundamentally also suited as the organosilicon precursor. Their use however, compared to silicone resins, is typically associated with higher costs for the raw material and more complex further processing (to address for example moisture sensitivity).

To obtain bearing components based on silicon carbide from organosilicon precursors, the reaction pyrolysis is carried out preferably under a protective gas (inert gas atmosphere, for example, argon) or in a vacuum. For example, silicon is suited as the chemically reactive filler. Polysilanes or polycarbosilanes can be used as the organosilicon precursors, but they in turn lead to much higher costs. Therefore, in this case, for economic reasons cross-linking silicones, silicon resins or polysilsesquioxanes are preferred.

It is thus possible using the process here to produce ceramic bearing components for standard applications and special applications having material properties which have been specifically modified optionally for example in certain mechanical characteristics and which are matched to the corresponding special requirements.

BRIEF DESCRIPTION OF THE DRAWING FIGURE

The foregoing and additional features and characteristics of the present invention will become more apparent from the following detailed description considered with reference to the accompanying drawing FIGURE which is a schematic illustration of a process sequence for use in producing ceramic bearing components.

DETAILED DESCRIPTION

Referring to the drawing FIGURE, the fabrication of bearing components according to one disclosed embodiment of the invention involves initially producing, as shown in step S1, a suitable filler preparation. The filler preparation contains as the chemically reactive portion a silicon/metal or silicon/metal/metal silicide mixture in an atomic ratio shifted in favor of silicon, including an atomic ratio of silicon to metal of a total of almost 2:1 so that there is approximately two times as much, or even more, silicon in the mixture compared to the metal content. In a preferred embodiment, a mixture of silicon and iron, optionally with the addition of iron silicide, is used. Other chemically reactive or inert fillers can also be added. Like their volumetric proportion, a small grain size of especially the chemically reactive components is important for monitoring and minimizing the shrinkage which is associated with the density increase and which occurs in the pyrolytic polymer-ceramic reaction. Therefore a chemically reactive filler in powder form with a grain sizes in the range between about 1 micron and several dozen microns is used, while the inert filler (for example boron nitride, silicon nitride, the latter especially to improve the reaction kinetics in the formation of silicon nitride) can also be present as a coarser powder.

The preparation of the filler can include, for example, process steps such as purification, mixing, grinding (for example, with production of a premixture of filler power with some organometallic precursor), screening, coating (for example, silane, polymer precursor: for example by way of precipitation technology, especially for absorbing higher volumetric proportions of filler) and prior dissolution. Finally, to improve the mechanical properties (here especially crack resistance, fracture toughness, fatigue resistance, wear resistance, hardness) of the ceramic final product, finely distributed zirconium oxide and/or aluminum oxide and/or silicon carbide can be added and fibers used, with short fibers being preferably suited due to the associated lower costs. The electrical resistance can be adjusted via a suitable selection of the filler combination and the composition of the polymer used (for example, carbon and oxygen content) since the conductivity decreases with lower carbon or carbide proportion in the ceramic produced. Similarly, the other material properties such as the coefficient of thermal expansion, the thermal conductivity, the modulus of conductivity or the magnetic behavior can be influenced.

In the next step S2 shown in the drawing FIGURE, a material mixture is produced from the filler which has been prepared in the manner discussed above and from at least a liquid or solid organometallic compound as a preceramic precursor. Suitable organometallic compounds are especially cross-linking organosilicon compounds. In the embodiment described further below, a polysilsesquioxane (for example, methylpolysilsesquioxane, vinyl methylphenyl hydrogen polysilsesquioxane) is used as a preferred polysiloxane. The addition of the material mixture, depending on the form of the polysilsesquioxane (liquid with varied viscosity or solid) and the volumetric proportion of the filler (typically around 30% to 50%), for example to a suspension, solvent dispersal, hot liquid or dry mixing, can take place for instance by kneading, stirring, intensive mixing and the like. Depending on the form of the material mixture in step S3, degassing, drying or extrusion and granulation can follow as an afterpreparation step. Special attention should be paid to the homogeneity of the mixture.

In step S4 which follows step S3, the material mixture is subjected to shaping which is oriented roughly to the outline of the bearing component which is to be produced. For instance, this can be accomplished by casting (for example, unpressurized, hot casting, injection molding) or pressing. In doing so, special attention should be paid to homogeneity and compact filling of the selected mold. If, for example, roller-shaped roll bodies are to be produced, a mold capable of shaping a round rod is suitable. The mold can however also be made such that the material mixture is shaped into a tube from which rings for roller bearings or for slide bearings are produced. In principle, all current forms of bearing components, such as for example roll bodies or bearing rings or semifinished articles for producing bearing components can be implemented.

Step 4 is followed by step S5 in which the material mixture is cured in the mold using the cross-linking mechanisms of the polysilsesquioxane used (for example, addition or condensation cross-linking) into a so-called green component. This is induced or takes place generally by heat at a temperature of roughly 100° C. to 300° C. In addition, there can be action by pressure (for example, hot pressing at a few 100 bar). Alternatively, the cross-linking can be carried out in principle by irradiation at room temperature and using additives. Irradiation can also be used in addition to the thermally induced cross-linking. In this case, irradiation takes place above room temperature.

The green component has a stable shape, but is still comparatively soft so that it can be easily worked mechanically. The mechanical working to near the final state occurs in step S6 which follows step S5. For example, for low tool wear, one or more roller bearing components can be produced from the green component by machining, with respect to the desired final dimensions only a small addition being necessary for final finishing. Thus, to produce cylinder rolls from a round rod, individual sections can be cut off and by turning and/or grinding can be brought to the desired rough dimensions of the cylinder roll. Finishing (for example, grinding, honing, lapping), with which the final dimensions and the desired surface topography can be produced, takes place at a later point in the process.

When rough working of the green component is completed, the mechanically worked green component is subjected to reaction pyrolysis in step S7 by which the cross-linked material mixture of the mechanically worked green component is converted into a ceramic (ceramicization). Reaction pyrolysis (thermolysis) is carried out with pressure control, in the preferred embodiment, in a nitrogen atmosphere. For the individual steps a nitrogen overpressure can be chosen conventionally in the range of a few bar to roughly 50 bar (higher pressures are possible, but the process may become less economical in this way).

The temperature during the reaction pyrolysis, which begins starting from roughly 400° C. after one or more possible intermediate steps, is in the range around roughly 600° C., with a total of roughly 1 hour holding time, in which the nitrogen overpressure is especially important for use of the temporary open porosity for the reaction with the chemically reactive filler, typically 1500° C. over for example 6 hours, here likewise a temperature-controlled process in several steps being possible. Fundamentally lower temperatures of, for example, 1000° C. can also be chosen. It should then be expected that there is still a certain portion of residual polymer which increases as the temperature decreases in the ceramic material which had been produced in this way. To produce a high-quality ceramic, generally temperatures between 1200° C. and 1500° C. are necessary. But higher temperatures up to roughly 1700° C. are also possible, so that overall a temperature range from roughly 1000° C. to 1700° C. is possible for the single-stage or multistage process (for economic reasons, temperatures not greater than roughly 1400° C. to 1500° C. are generally preferred).

Among the described reaction conditions, the cross-linked green component is converted into a ceramic material based on silicon nitride and the oxygen contained in the organic precursor is largely expelled. The ceramic product produced in this way has microscopic structuring and only low porosity, typically on the order of a maximum few percent, which is moreover closed and very finely distributed. In addition to the main component silicon nitride, the ceramic composite material which has been produced contains predominantly carbides and a small amount of residual oxygen which is especially oxide-bound, and of metallic components. Depending on the filler combination used (for example, oxides of aluminum and zirconium oxide; also for example aluminum as a chemically reactive filler component for forming aluminum oxide with the oxygen contained in the polymer) and the process control, ceramics with higher oxygen content can also be produced in a dedicated and material-optimized manner.

Within the framework of reaction pyrolysis, the components of the material mixture or the decomposition fragments of the polymer matrix react both among one another and also with the surrounding nitrogen atmosphere. In this way, it is possible to compensate for the shrinkage which is associated with the density increase and the (carbon) hydrogen removal of the polymers of the cross-linked material mixture by a corresponding increase of volume, especially by the chemical reaction of the filler which is associated with expansion, so that ultimately the total volume remains almost unchanged. In any case, especially in the production of simple shaped articles, such as roll bodies in the described embodiment, due to the favorable geometry for process simplification, also greater shrinkage to the desired target dimensions on a controlled basis can be allowed. A large enough ratio between the surface and the volume of the chemically reactive filler powder is especially important for almost shrinkage-free component ceramicization, for which reason the grain size used is in the range around 1 micron to several dozen microns. In this connection, to optimize the process other chemically reactive fillers can be used, such as for example aluminum, boron or chromium, and in addition also chemically inert fillers, such as for example silicon nitride or boron nitride. Here, inert filler powders with a larger grain size and/or fibers (especially short fibers) and finely-distributed zirconium oxide, aluminum oxide and/or silicon carbide can be introduced. The choice of suitable filler combinations, polymer compositions and pyrolysis conditions (pressure and temperature control) allows very efficient material optimization (for example, fatigue and wear behavior, mechanical characteristics, electrical conductivity, coefficient of thermal expansion, thermal conductivity). After reaction pyrolysis, conventional aftersintering can follow to, for example, further improve the material properties.

To produce the final form of the bearing component, step S7 is followed by step S8 in which mechanical finishing of the surface of the ceramic body takes place, for instance with a diamond tool. In this way, in step S9, the bearing component is present as the final product, as described above in the preferred embodiment consisting of a ceramic based on silicon nitride. Finishing can involve, for example, grinding, honing and/or lapping processes in which the dimensions of the bearing component are brought to the desired final values and/or the desired surface topography (especially roughness) is produced, especially in the area of the roller or sliding surfaces. To improve the mechanical properties, the ceramicized bearing component can also be shot-peened, by which crack-inhibiting residual compressive forces are introduced in the edge area. This can take place before or after mechanical finishing.

The principles, preferred embodiments and operational characteristics of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. Process for producing ceramic bearing components comprising:
   producing a material mixture from an organometallic compound as a preceramic precursor and from silicon and iron in element form or in a form of an alloy as a chemically reactive filler; and subjecting the material mixture to reaction pyrolysis to convert the material mixture into a ceramic material.

2. Process according to claim 1, wherein the material mixture is produced from a cross-linking organometallic compound as the preceramic precursor.

3. Process according to claim 1, wherein the material mixture contains a silicone or polysiloxane as the preceramic precursor.

4. Process according to claim 1, wherein the material mixture contains a silicone resin or polysilsesquioxane as the preceramic precursor.

5. Process according to claim 1, wherein the chemically reactive filler is processed in powder form with a grain size in a range of about 1 micron to several dozen microns.

6. Process according to claim 1, wherein the material mixture contains an inert filler.

7. Process according to claim 1, wherein the material mixture contains fibers to improve mechanical properties.

8. Process according to claim 7, wherein the fibers in the material mixture are short fibers.

9. Process according to claim 1, wherein the material mixture contains zirconium oxide and/or aluminum oxide and/or silicon carbide and/or silicon nitride to improve mechanical properties and/or reaction kinetics.

10. Process according to claim 1, wherein the reaction pyrolysis is carried out at least partially in a chemically inert gas atmosphere or in a vacuum.

11. Process according to claim 1, wherein the reaction pyrolysis is carried out at a temperature between 1000° C. and 1700° C.

12. Process according to claim 11, wherein the reaction pyrolysis is carried out at a temperature between 1200° C. and 1500° C.

13. Process according to claim 1, wherein the ceramic material is subjected to aftersintering following the reaction pyrolysis.

14. Process according to claim 1 further comprising:
shaping the material mixture to a configuration approaching the bearing component and stabilizing the organometallic compound in the material mixture by curing before the reaction pyrolysis.

15. Process according to claim 14, wherein the curing is carried out by heat at a temperature between about 100° C. to 300° C.

16. Process according to claim 14, wherein the curing is carried out by radiation.

17. Process according to claim 14, wherein the curing is carried out under pressure.

18. Process according to claim 14, wherein upon curing a semifinished article of stable shape is produced from the material mixture, and including mechanical working the semifinished article before the reaction pyrolysis to produce the bearing components almost to a final state.

19. Process according to claim 1, wherein the material mixture is produced from an organosilicon compound as the preceramic precursor.

20. Process for producing ceramic bearing components comprising:
producing a material mixture from an organometallic compound as a preceramic precursor and from silicon in element form or in a form of an alloy as a chemically reactive filler;
subjecting the material mixture to reaction pyrolysis to convert the material mixture into a ceramic material; and subjecting the material mixture to at least one heat treatment in the range from 400° C. to 1000° C. with a holding time of approximately 1 hour before the reaction pyrolysis.

21. Process according to claim 20, wherein the material mixture is produced from a cross-linking organometallic compound as the preceramic precursor.

22. Process according to claim 20, wherein the chemically reactive filler is processed in powder form with a grain size in a range of about 1 micron to several dozen microns.

23. Process according to claim 20, wherein the material mixture contains an inert filler.

24. Process according to claim 20, wherein the material mixture contains zirconium oxide and/or aluminum oxide and/or silicon carbide and/or silicon nitride to improve mechanical properties and/or reaction kinetics.

25. Process according to claim 20, wherein the reaction pyrolysis is carried out at least partially in a chemically inert gas atmosphere or in a vacuum.

26. Process according to claim 20, wherein the reaction pyrolysis is carried out at a temperature between 1000° C. and 1700° C.

27. Process for producing ceramic bearing components comprising:
producing a material mixture from an organometallic compound as a preceramic precursor and from silicon in element form or in a form of an alloy as a chemically reactive filler; and
subjecting the material mixture to reaction pyrolysis to convert the material mixture into a ceramic material,
wherein after carrying out the reaction pyrolysis, the ceramic material is mechanically finished.

28. Process according to claim 27, wherein the material mixture is produced from a cross-linking organometallic compound as the preceramic precursor.

29. Process according to claim 27, wherein the chemically reactive filler is processed in powder form with a grain size in a range of about 1 micron to several dozen microns.

30. Process according to claim 27, wherein the material mixture contains an inert filler.

31. Process according to claim 27, wherein the material mixture contains zirconium oxide and/or aluminum oxide and/or silicon carbide and/or silicon nitride to improve mechanical properties and/or reaction kinetics.

32. Process according to claim 27, wherein the reaction pyrolysis is carried out at least partially in a chemically inert gas atmosphere or in a vacuum.

33. Process according to claim 27, wherein the reaction pyrolysis is carried out at a temperature between 1000° C. and 1700° C.

34. Process for producing ceramic bearing components comprising:
producing a material mixture from an organometallic compound as a preceramic precursor and from silicon in element form or in a form of an alloy as a chemically reactive filler; and
subjecting the material mixture to reaction pyrolysis to convert the material mixture into a ceramic material,
wherein after carrying out the reaction pyrolysis, the ceramic material is subjected to shot-peening.

35. Process according to claim 34, wherein the material mixture is produced from a cross-linking organometallic compound as the preceramic precursor.

36. Process according to claim 34, wherein the chemically reactive filler is processed in powder form with a grain size in a range of about 1 micron to several dozen microns.

37. Process according to claim 34, wherein the material mixture contains an inert filler.

38. Process according to claim 34, wherein the material mixture contains zirconium oxide and/or aluminum oxide and/or silicon carbide and/or silicon nitride to improve mechanical properties and/or reaction kinetics.

39. Process according to claim 34, wherein the reaction pyrolysis is carried out at least partially in a chemically inert gas atmosphere or in a vacuum.

40. Process according to claim 34, wherein the reaction pyrolysis is carried out at a temperature between 1000° C. and 1700° C.

41. Process for producing ceramic bearing components comprising:
   producing a material mixture from an organometallic compound as a preceramic precursor and from silicon in element form or in a form of an alloy as a chemically reactive filler; and
   subjecting the material mixture to reaction pyrolysis to convert the material mixture into a ceramic material,
   wherein the atomic ratio of metal to silicon in the material mixture is approximately 1:2.

42. Process according to claim 41, wherein the material mixture is produced from a cross-linking organometallic compound as the preceramic precursor.

43. Process according to claim 41, wherein the chemically reactive filler is processed in powder form with a grain size in a range of about 1 micron to several dozen microns.

44. Process according to claim 41, wherein the material mixture contains an inert filler.

45. Process according to claim 41, wherein the material mixture contains zirconium oxide and/or aluminum oxide and/or silicon carbide and/or silicon nitride to improve mechanical properties and/or reaction kinetics.

46. Process according to claim 41, wherein the reaction pyrolysis is carried out at least partially in a chemically inert gas atmosphere or in a vacuum.

47. Process according to claim 41, wherein the reaction pyrolysis is carried out at a temperature between 1000° C. and 1700° C.

48. Process for producing ceramic bearing components comprising:
   producing a material mixture from an organometallic compound as a preceramic precursor and from silicon in element form or in a form of an alloy as a chemically reactive filler; and
   subjecting the material mixture to reaction pyrolysis to convert the material mixture into a ceramic material,
   wherein the material mixture contains a second metal as the chemically reactive filler, and
   wherein the second metal is selected from the group consisting of iron in element form, and iron in the form of an alloy.

49. Process according to any one of claims 1, 20, 14, 27, 34 and 41, wherein the material mixture contains a second metal in element form, in the form of an alloy, in the form of an intermetallic phase or in the form of any chemical composition as the chemically reactive filler.

50. Process according to claim 49, wherein the material mixture contains a metal silicide as the chemically reactive filler.

51. Process according to claim 49, wherein the material mixture contains more silicon than iron.

52. Process according to claim 49, wherein the second metal is selected from the group consisting of chromium, iron, molybdenum and aluminum.

53. Process according to any one of claims 1, 20, 14, 27, 34 and 41, wherein the reaction pyrolysis is carried out at least partially in a chemically reactive gas atmosphere.

54. Process according to claim 53, wherein the reaction pyrolysis is carried out in a nitrogen atmosphere.

* * * * *